March 3, 1936.  S. R. BUNKER  2,032,834

CABLE CONNECTER

Filed July 23, 1935

Inventor
Samuel R. Bunker

By Clarence A. O'Brien
Attorney

Patented Mar. 3, 1936

2,032,834

UNITED STATES PATENT OFFICE 2,032,834

CABLE CONNECTER

Samuel R. Bunker, Ellsworth, Maine

Application July 23, 1935, Serial No. 32,784

1 Claim. (Cl. 173—259)

This invention relates to a cable connecter for connecting a cable to a battery post, the general object of the invention being to provide means whereby the connecter can be easily and quickly attached to a post or removed therefrom with an ordinary wrench and without danger of injuring either the post or the connecter.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like or corresponding parts throughout the several views, and in which:—

Figure 1:
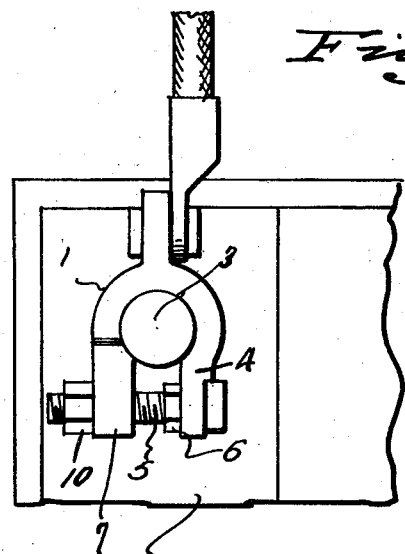
Figure 1 is a fragmentary top plan view showing the invention in use for connecting a cable to a battery post.
Figure 2:
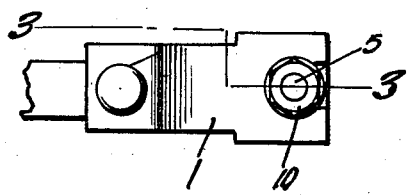
Figure 2 is an edge view of the connecter.
Figure 3:
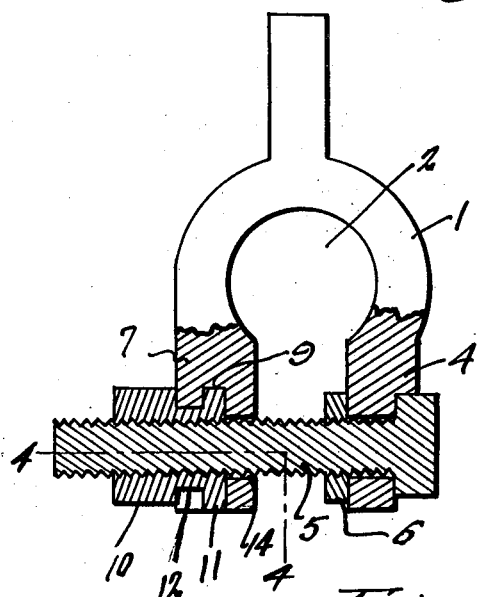
Figure 3 is a section on the line 3—3 of Figure 2.
Figure 4:
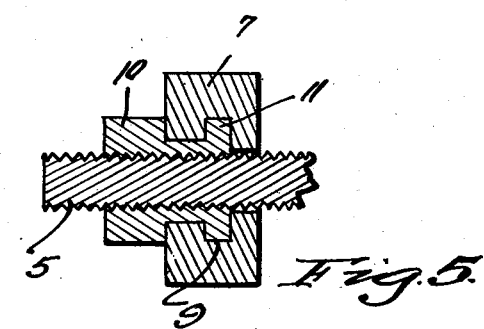
Figure 4 is a section on the line 4—4 of Figure 3.
Figure 5:
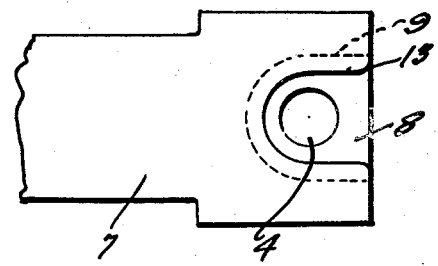
Figure 5 is a view looking toward the nut receiving end of the connecter.
Figure 6:
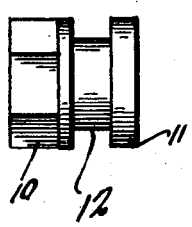
Figure 6 is a view of the nut.

In this drawing the numeral 1 indicates the body of the connecter which has a circular opening 2 therein for receiving the post 3 of the battery B, the ends of the body being enlarged and spaced apart with one end 4 having a reduced part which has a plain hole therein for the passage of the bolt 5, the reduced part forming a shoulder for engagement by the head of the post so that the bolt is held against turning movement by said shoulder. The shank of the bolt is threaded from the head to its free end so that a lock nut 6 can be threaded on the bolt to engage the inner face of the part 4 to hold the bolt firmly in said part 4. The other end 7 of the body is formed with a recess 8 at its outer face which is of substantially U-shape and the side walls of which are undercut to form the groove 9. A nut 10 has a flange 11 at one end and a groove 12 separates the flange from the rest of the nut and the flange is adapted to fit in the recess with its edges engaging the groove and the flange 13 formed by the groove 9 engaging the groove 12 of the nut. The outer portion of the nut is of non-circular shape in cross section to receive the wrench.

Thus it will be seen that it is simply necessary to place the nut 10 in the recess 8 and to pass the bolt through the openings in the ends 4 and 5, and through the nut the opening 14 in the inner part of the portion 7 being plain as shown. The lock nut 6 is tightened to hold the bolt in place and then the nut 10 is turned and will cause the part 7 to move toward the part 4 and thus clamp the body on the post. By reversing the rotary movement of the nut 10 the parts 4 and 7 are spread apart so that the connecter can be readily lifted off the post.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A device for connecting a cable to a battery post, comprising a body part of substantially U-shape, providing for an opening for fitting over a post, and a pair of spaced thickened ends, each end having a plain transversely extending opening therein, and one end being reduced in thickness to provide a shoulder at its outer face, a bolt passing through the openings with its head engaging the shoulder, the inner face of said reduced end being flat, a nut threaded on the bolt and engaging said flat part of the inner face, the outer face of the other end having a substantially U-shaped recess therein projecting out through its end and having its wall under-cut, a nut having a groove therein forming a flange, the flange fitting in the groove formed by the under-cut, a portion of the nut extending beyond the outer face of the last mentioned end of the body and shaped to receive a wrench, the bolt passing through the nut.

SAMUEL R. BUNKER.